United States Patent [19]
Kawamura et al.

[11] Patent Number: 5,587,766
[45] Date of Patent: Dec. 24, 1996

[54] CAMERA WHICH SETS AN INTERNAL APERTURE VALUE IN ACCORDANCE WITH A CONVERTED PHOTOGRAPHIC LENS APERTURE VALUE

[75] Inventors: Koichiro Kawamura, Ichihara; Ryo Uehara, Yokohama, both of Japan

[73] Assignee: Nikon Corporation, Tokyo, Japan

[21] Appl. No.: 516,140

[22] Filed: Aug. 17, 1995

[30]  Foreign Application Priority Data

Feb. 13, 1995 [JP] Japan .................................. 7-024254

[51] Int. Cl.⁶ .................... G03B 7/095; G03B 7/097; G03B 7/20; G03B 17/18
[52] U.S. Cl. .................... 396/257; 348/340; 348/366; 396/281
[58] Field of Search .................... 354/455, 441, 354/443, 465; 348/362–366, 340

[56]  References Cited

U.S. PATENT DOCUMENTS

| | | | |
|---|---|---|---|
| 4,558,940 | 12/1985 | Tano et al. | 354/455 |
| 4,833,498 | 5/1989 | Kato et al. | 348/362 X |
| 4,970,541 | 11/1990 | Nakai et al. | 354/455 X |

*Primary Examiner*—W. B. Perkey
*Attorney, Agent, or Firm*—Staas & Halsey

[57]  ABSTRACT

A camera which sets an aperture value of an internal aperture in accordance with the open aperture value of a photographic lens aperture of an installed photographic lens. A reduction optical system reduces an optical image formed by the photographic lens when the photographic lens is installed on the camera, the optical image being reduced by a reduction ratio. An internal aperture of the camera has a settable aperture value. A control unit receives the open aperture value of the photographic lens aperture when the photographic lens is installed on the camera, conveys the open aperture value in accordance with the reduction ratio of the reduction optical system, and sets an aperture value of the internal aperture in a range having a lower limit of approximately the converted open aperture value. Additionally, the control unit can set the aperture value of the internal aperture to produce the correct exposure time in accordance with an exposure time of an image pickup element and the converted open aperture value, where the exposure time is set by the photographer. Moreover, the aperture value of the internal aperture can be set by the photographer, and the control unit can then set the exposure time of an image pickup element in accordance with the set exposure time and the converted open aperture value.

10 Claims, 10 Drawing Sheets

CAMERA WHICH SETS AN INTERNAL APERTURE VALUE IN ACCORDANCE WITH A CONVERTED PHOTOGRAPHIC LENS APERTURE VALUE

BACKGROUND OF THE INVENTION

1. Field of the Invention

The present invention relates to a camera having a lens installed thereon and, more particularly, to the determination of an aperture value for an internal aperture inside the camera in accordance with the aperture value of an aperture inside the installed lens.

2. Description of the Related Art

Many conventional electronic silver salt cameras are designed to have a photographic lens installed thereon. Such cameras have an image pickup element positioned in the film plane. The photographic lens forms an optical image on the image pickup element.

Generally, only part of the optical image formed by the photographic lens is picked up by the image pickup element since the photoreceptor plane of the image pickup element is generally small in comparison with a typical film size of 24×36 mm. Therefore, a conventional type of electronic silver salt camera positions a reduction optical system between the photographic lens and the image pickup element. In this manner, the optical image formed by the photographic lens is reduced to the size of the photoreceptor plane of the image pickup element. Such a conventional silver salt camera is disclosed, for example, in Japanese Laid-Open Patent Publication No. HEI 6-169428.

FIG. 1 is a diagram illustrating such a conventional silver salt camera. Referring now to FIG. 1, a photographic lens 51 for a silver salt camera is installed on an electronic camera body 50. A lens aperture 52 is positioned inside photographic lens 51. A quick return mirror 53 is positioned at an angle to the optical axis I of photographic lens 51, and a half-mirror 54 is positioned at an angle in the reflection direction 60 of quick return mirror 53. A photometric unit 55 is positioned in the permeation direction 62 of half-mirror 54, and a viewfinder 56 is positioned in the reflection direction 64 of half-mirror 54. A reduction optical system 57, an internal aperture 58, and a CCD element 59 are positioned behind quick return mirror 53 along the optical axis I of photographic lens 51. The camera has a release button (not illustrated) having a half-push position and a full-push position. Various photographic processes, such as rangefinding and photometry, are performed when the photographer pushes the release button to the half-push position. An exposure operation is performed when the photographer pushes the release button to the full-push position.

In a camera as illustrated in FIG. 1, when lens aperture 52 in photographic lens 51 is held in an open condition, the pushing of the release button to the half-push position causes photometric unit 55 to perform photometry on light from the photographic subject (not illustrated) passing through lens aperture 52.

Here, when the apex value of the subject brightness is "Bv," and the apex value of the open aperture value of lens aperture 52 is "AvO," the apex value Lv of the photometric value from the photometric unit 55 is found from the following Equation 1.
Equation 1:

$$Lv = Bv - AvO$$

Alternatively, when the apex value of the correct exposure value is "Ev," the apex value of the aperture value of internal aperture 58 is "Av," the apex value of the exposure time is "Tv," and the apex value of the sensitivity of the CCD element 59 is "Sv," the correct exposure Ev can be found from the following Equation 2.
Equation 2:

$$Ev = Av + Tv = Bv + Sv$$

The following Equation 3 is obtained when Equation 1 is substituted into Equation 2.
Equation 3:

$$Ev = Av + Tv = (Lv + AvO) + Sv$$

Therefore, the right side of Equation 3, above, is computed from the apex value Lv determined by photometric unit 55 and the open aperture value AvO received from photographic lens 52. In this manner, the correct exposure value Ev is determined.

After the correct exposure value Ev is determined, and the photographer pushes the release button to the full-push position, the aperture value Av of internal aperture 58 and the exposure time Tv of CCD element 59 are adjusted to match the correct exposure value Ev, and the subject is photographed.

In this type of electronic camera, the incident luminous flux 90 from photographic lens 51 passes through two stages (a first stage being a pass through lens aperture 52 and a second stage being a pass through internal aperture 58) before reaching CCD element 59. Therefore, the amount of luminous flux is limited by the diameter of lens aperture 52. As a result, if lens aperture 52 is opened to a maximum diameter to allow an upper limit of luminous flux to pass therethrough, the illumination of the image plane of CCD element 59 cannot be increased any further. Thus, increasing the diameter of internal aperture 58 will not increase the illumination of the image plane beyond the upper limit allowed by lens aperture 52.

Because this upper limit on the luminous flux varies with the photographic lens being used, it is necessary for the photographer to perform an exposure setting operation while taking into account the aperture value control range for each photographic lens used. For this reason, the exposure setting operation is difficult and complicated.

SUMMARY OF THE INVENTION

Accordingly, it is an object of the present invention to provide a camera which accurately sets the aperture value of an internal aperture according to the specifications of the installed photographic lens.

It is an additional object of the present invention to set the aperture value of an internal aperture in accordance with the aperture value of an aperture in an installed photographic lens of a camera.

Objects of the present invention are achieved by providing a camera having a photographic lens installable thereon. The photographic lens includes a photographic lens aperture having an open aperture value. A reduction optical system reduces an optical image formed by the photographic lens when the photographic lens is installed on the camera, the optical image being reduced by a reduction ratio. An internal aperture of the camera has a settable aperture value and restricts light passing through the photographic lens and the reduction optical system when the photographic lens is installed on the camera. A control unit receives the open aperture value of the photographic lens aperture when the photographic lens is installed on the camera, converts the open aperture value in accordance with the reduction ratio of the reduction optical system, and sets an aperture value of the internal aperture in a range having a lower limit of approximately the converted open aperture value.

Objects of the present invention are also achieved by providing a camera having an internal aperture which includes a settable aperture value and which restricts light passing through the photographic lens and the reduction optical system when the photographic lens is installed on the camera. An image pickup element receives the optical image reduced by the reduction optical system and has an exposure time which is set by a photographer. A control unit receives the open aperture value of the photographic lens aperture when the photographic lens is installed on the camera, converts the open aperture value in accordance with the reduction ratio of the reduction optical system, receives the set exposure time of the image pickup element and sets the aperture value of the internal aperture to produce the correct exposure value in accordance with the set exposure time. A warning unit produces a warning to indicate that there is an insufficient quantity of light when the aperture value set by the control unit is smaller than the converted open aperture value.

Moreover, objects of the present invention are achieved by providing a camera which includes an internal aperture having an aperture value which is set by a photographer within a specific range and which restricts light passing through the photographic lens and the reduction optical system when the photographic lens is installed on the camera. An image pickup element receives the optical image reduced by the reduction optical system and has a settable exposure time. A control unit receives the open aperture value of the photographic lens aperture when the photographic lens is installed on the camera, converts the open aperture value in accordance with the reduction ratio of the reduction optical system, sets the lower limit of the specific range to be approximately the converted open aperture value, receives the aperture value set by the photographer within the specific range, sets the aperture value of the internal aperture to the set aperture value, and sets the exposure time of the image pickup element to produce the correct exposure time in accordance with the set aperture value.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
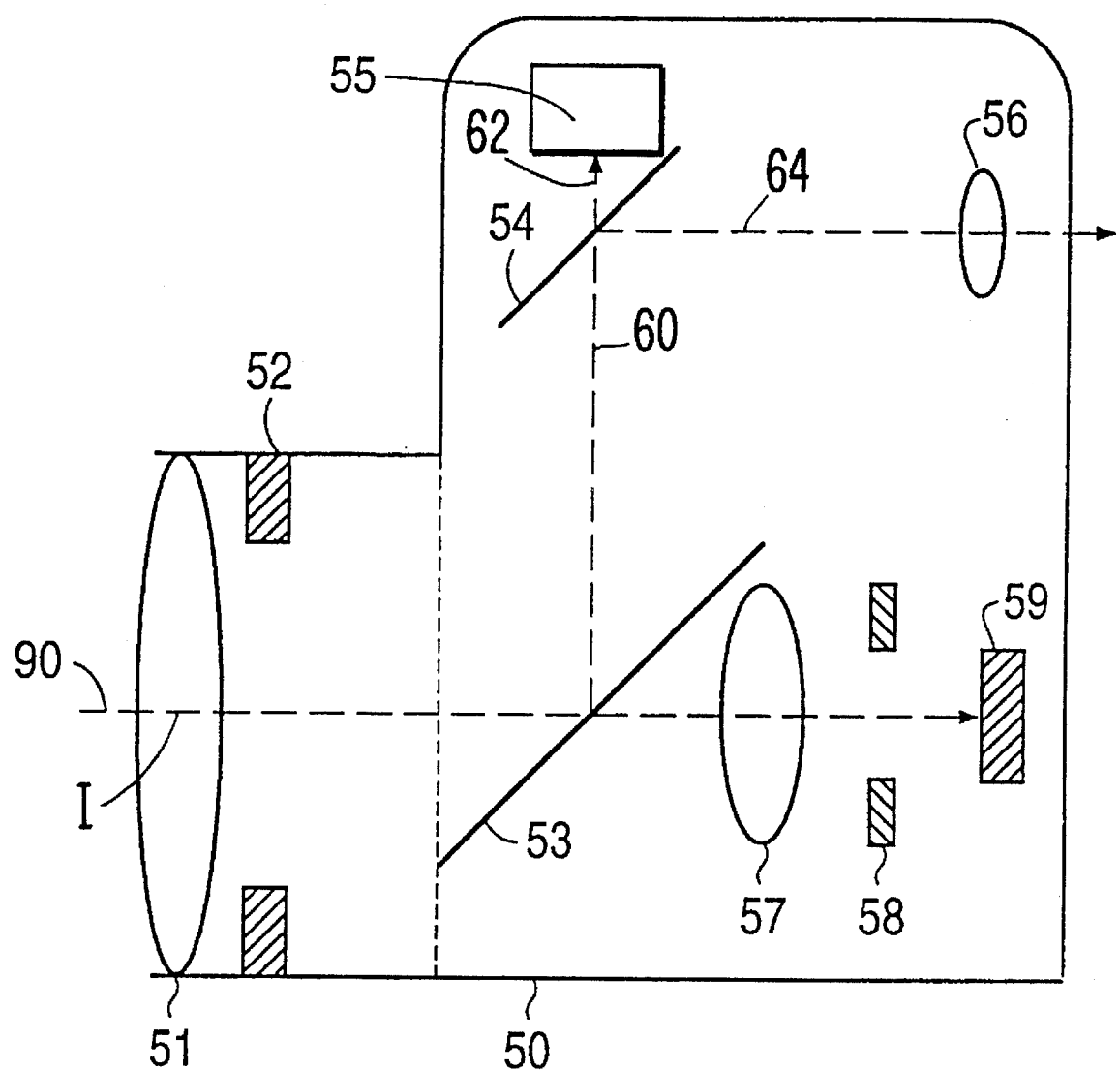
FIG. 1 (prior art) is a diagram illustrating a conventional camera.

Reference will now be made in detail to the present preferred embodiments of the present invention, examples of which are illustrated in the accompanying drawings, wherein like reference numerals refer to like elements throughout.

Figure 2:
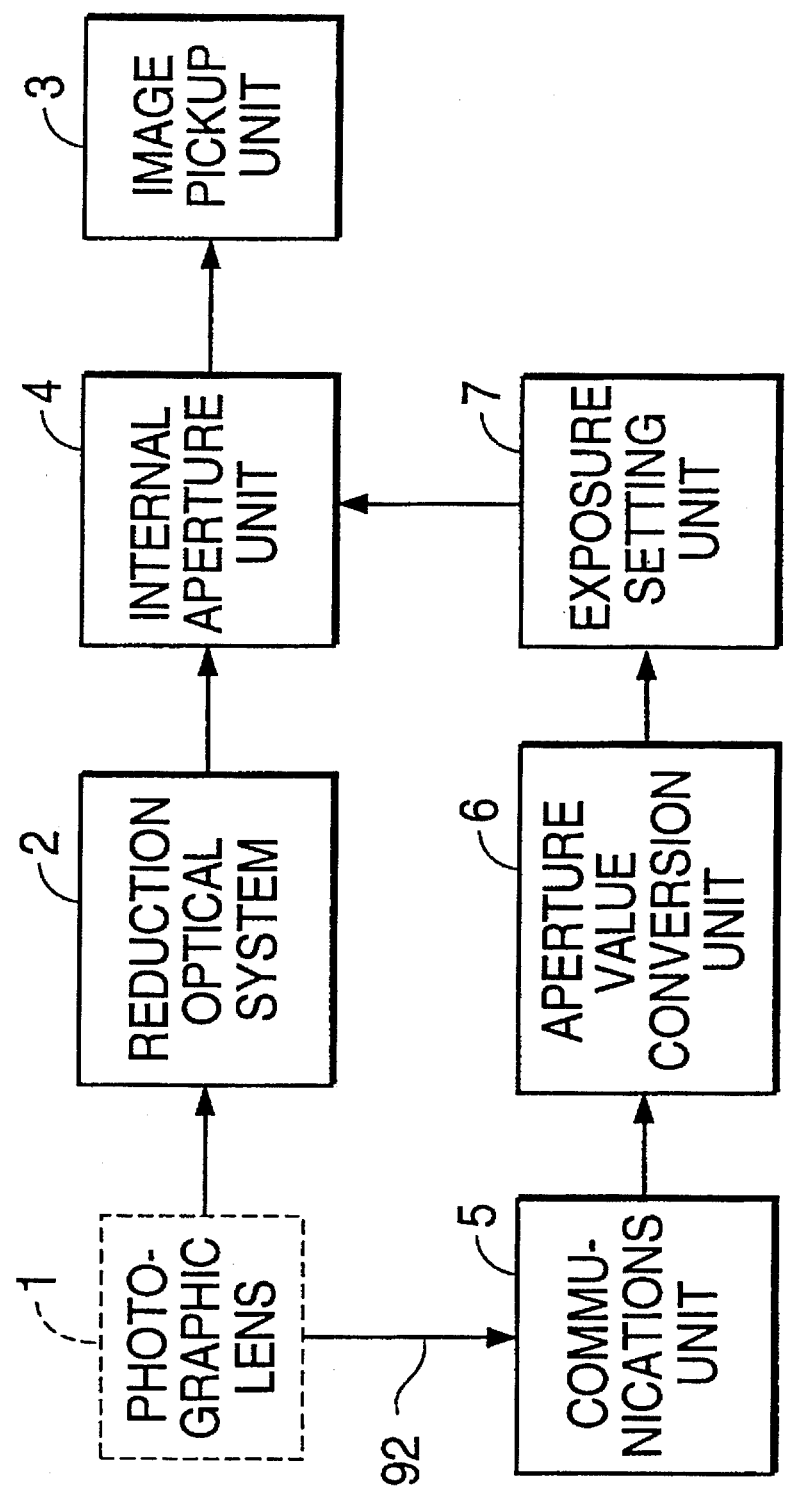
FIG. 2 is a diagram illustrating a camera which determines a control range for an internal aperture, according to an embodiment of the present invention.

FIG. 2 is a diagram illustrating a camera which determines a control range for an internal aperture, according to an embodiment of the present invention. Referring now to FIG. 2, a photographic lens 1 has an aperture (not illustrated) therein and forms an optical image (not illustrated) of a subject (not illustrated). The aperture in photographic lens 1 limits the quantity of light of luminous flux passing through photographic lens 1. A reduction optical system 2 receives the optical image formed by photographic lens 1, reduces the optical image, and projects the reduced optical image to an image plane of an image pickup unit 3. The reduction by reduction optical system 2 causes the illumination of the image plane of image pickup unit 3 to be increased by an amount commensurate with the amount of reduction. The image pickup unit 3 converts the optical image reduced by the reduction optical system 2 into image pickup signals.

An internal aperture unit 4 includes an aperture (not illustrated) and is positioned in reduction optical system 2 or between reduction optical system and image pickup unit 3. The aperture in internal aperture unit 4 restricts the quantity of light passing therethrough. A communications unit 5 receives the open aperture value of the aperture in photographic lens 1 from photographic lens 1. An aperture value conversion unit 6 receives the open aperture value from communications unit 5 and converts the open aperture value into a value corresponding to the aperture value of internal aperture unit 4, based on the optical image reduction ratio of reduction optical system 2. More specifically, aperture value conversion unit 6 multiplies the open aperture value of photographic lens 1 by the reduction ratio of reduction optical system 2. An exposure setting unit 7 receives the converted open aperture value from aperture value conversion unit 6, and sets an aperture value having the converted open aperture value as a lower limit for the internal aperture unit 4.

Even if the aperture value of the aperture in internal aperture unit 6 is set below the converted aperture value produced by the aperture value conversion unit 6, the illumination of the image plane of image pickup unit will not increase further. Therefore, exposure setting unit 7 sets the aperture value of the aperture in internal aperture unit 4 so that the converted open aperture value produced by aperture value conversion unit 6 is the lower limit of the aperture value of the aperture in internal aperture unit 4. In this manner, the control range of the aperture value of the aperture in internal aperture unit 4 is accurately determined for each photographic lens installed on the camera, and the aperture value of the aperture in internal aperture unit 4 is set within the control range.

Figure 3:
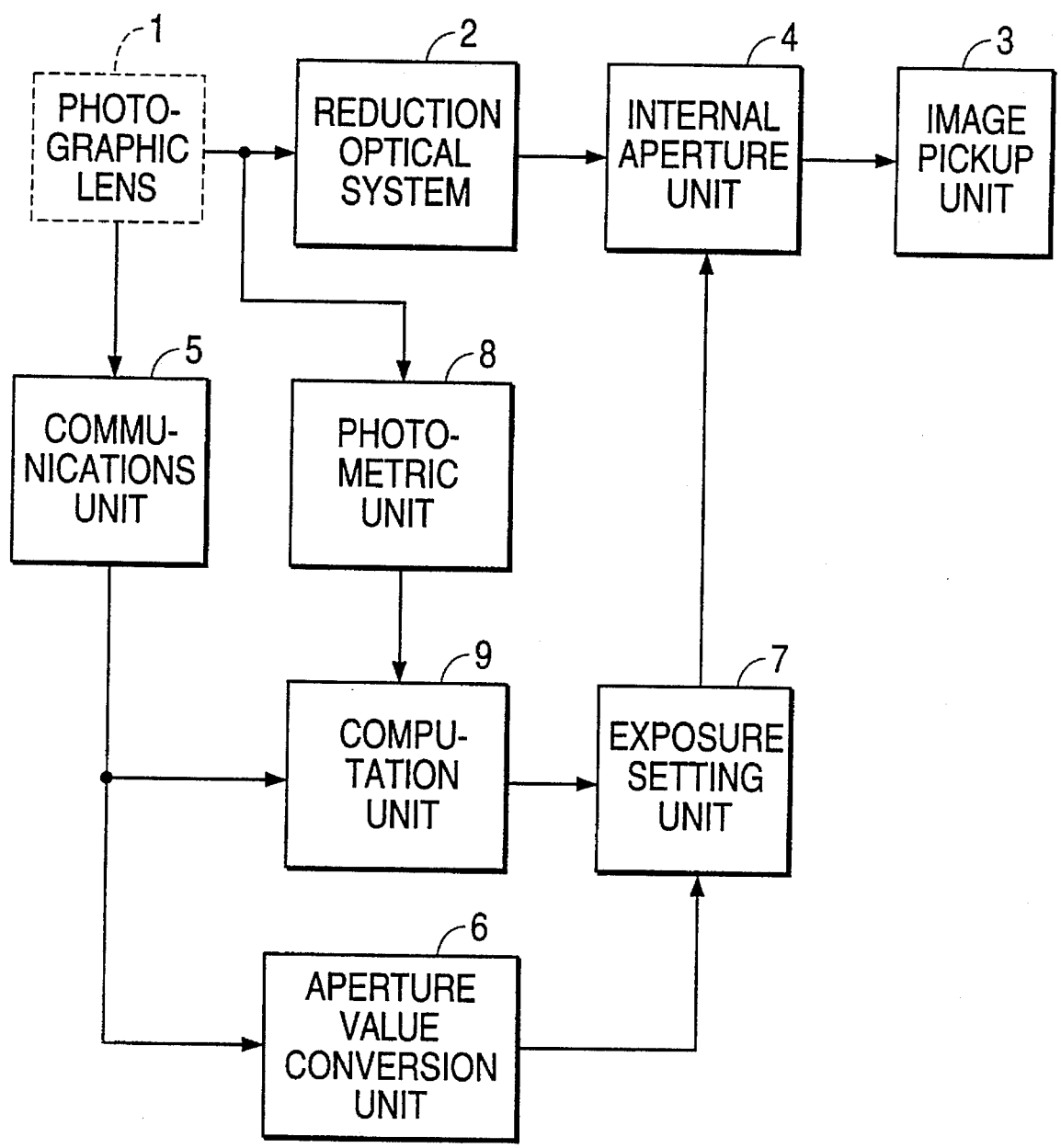
FIG. 3 is a diagram illustrating a camera which determines an aperture value of an internal aperture according to a photometric value and an aperture value of an installed photographic lens, according to an embodiment of the present invention.

FIG. 3 is a diagram illustrating a camera which determines an aperture value of an internal aperture according to both a photometric value and an aperture value of an aperture in an installed photographic lens, according to an additional embodiment of the present invention. Referring now to FIG. 3, with the aperture (not illustrated) built into photographic lens 1 in the open condition, a photometric unit 8 measures the photometric value of light from the subject passing through photographic lens 1. This photometric value drops by an amount commensurate with the open aperture value of the aperture in the photographic lens. A computation unit 9 computes the correct exposure value based on the photometric value computed by photometric unit 8 and the open aperture value received by communications unit 5 from photographic lens 1. Exposure setting unit 7 receives the converted open aperture value from aperture value conversion unit 6 and the correct exposure value computed by computation unit 9, and sets the aperture value of the aperture in internal aperture unit 4 in accordance with the correct exposure value and so that the set aperture value is within a range having the converted open aperture value from aperture value conversion unit 6 as a lower limit.

In this manner, information on the open aperture value of the aperture in an installed photographic lens 1 is used to accurately determine the control range of the aperture value of an aperture in internal aperture unit 4. Then, an aperture value within the control range is set so that the aperture value produces the correct exposure value.

Figure 4:
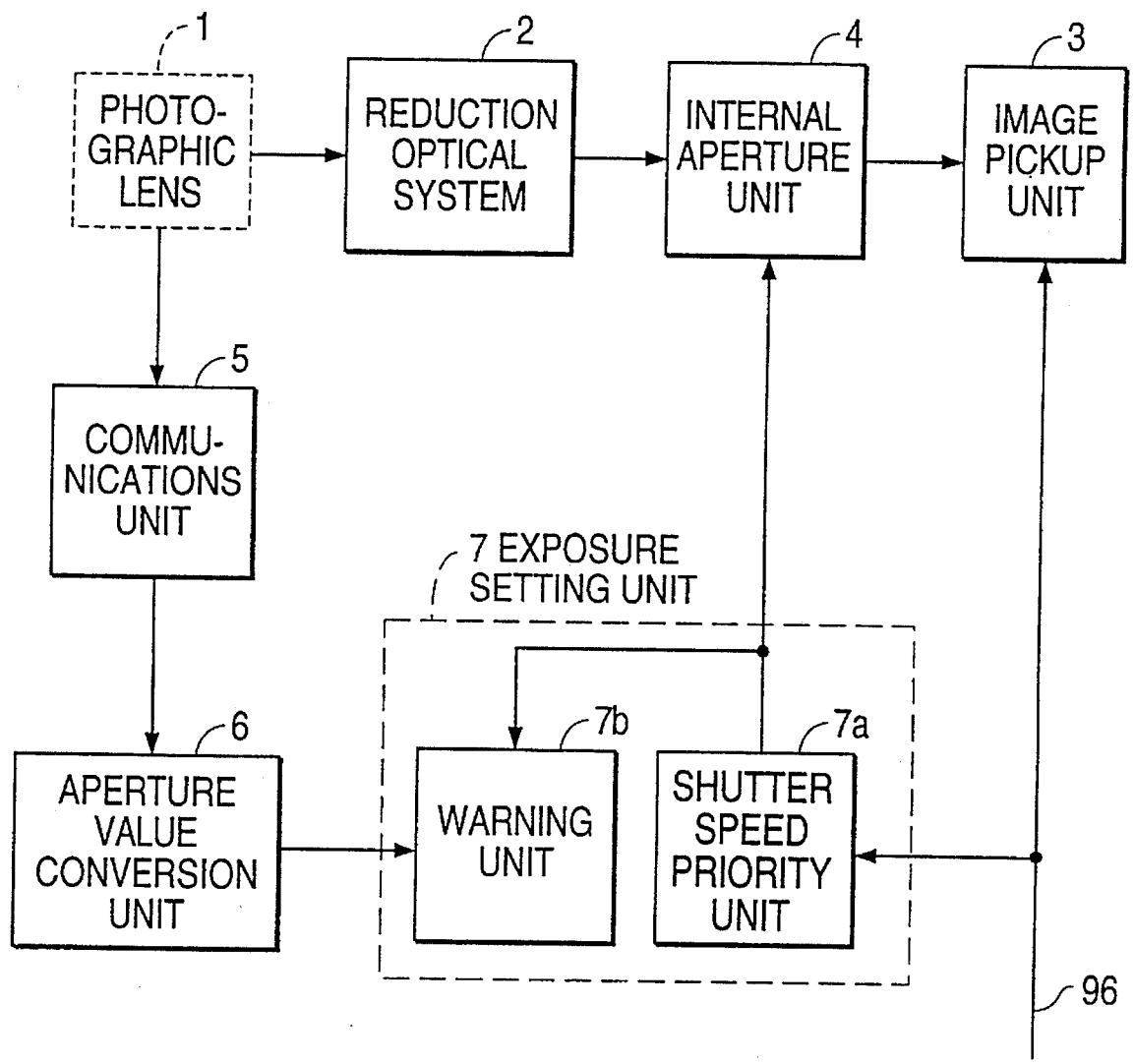
FIG. 4 is a diagram illustrating a camera which sets an aperture value of an internal value when the camera is in shutter speed priority exposure mode, according to an embodiment of the present invention.

FIG. 4 is a diagram illustrating a camera which sets an aperture value of an internal value when the camera is in shutter speed priority exposure mode, according to an embodiment of the present invention. Referring now to FIG. 4, exposure setting unit 7 includes a shutter speed priority unit 7a and a warning unit 7b. Shutter speed priority unit 7a receives an exposure time 96 (which was externally set by a photographer) of image pickup unit 3, and computes the aperture value which determines the correct exposure of internal aperture unit 4, according to the received exposure time. The correct exposure is based on, for example, a value produced by a photometric sensor or based on the correct exposure value determined in advance in accordance with the weather.

When the aperture value computed by shutter speed priority unit 7a is smaller than the converted open aperture value determined by aperture value conversion unit 6, the illumination of the image plane of image pickup unit 3 will not become any brighter than it already is, and the optimum quantity of light cannot be ensured. Therefore, warning unit 7b emits a warning indicating an insufficient quantity of light, thereby prompting an operator to change the exposure time setting.

In the above manner, in a shutter speed priority exposure mode in which the setting of the exposure time is given priority, the control range of the aperture value of the aperture in internal aperture unit 4 is determined, and a warning is generated when a set exposure time is set which would give an aperture value outside the control range.

Figure 5:
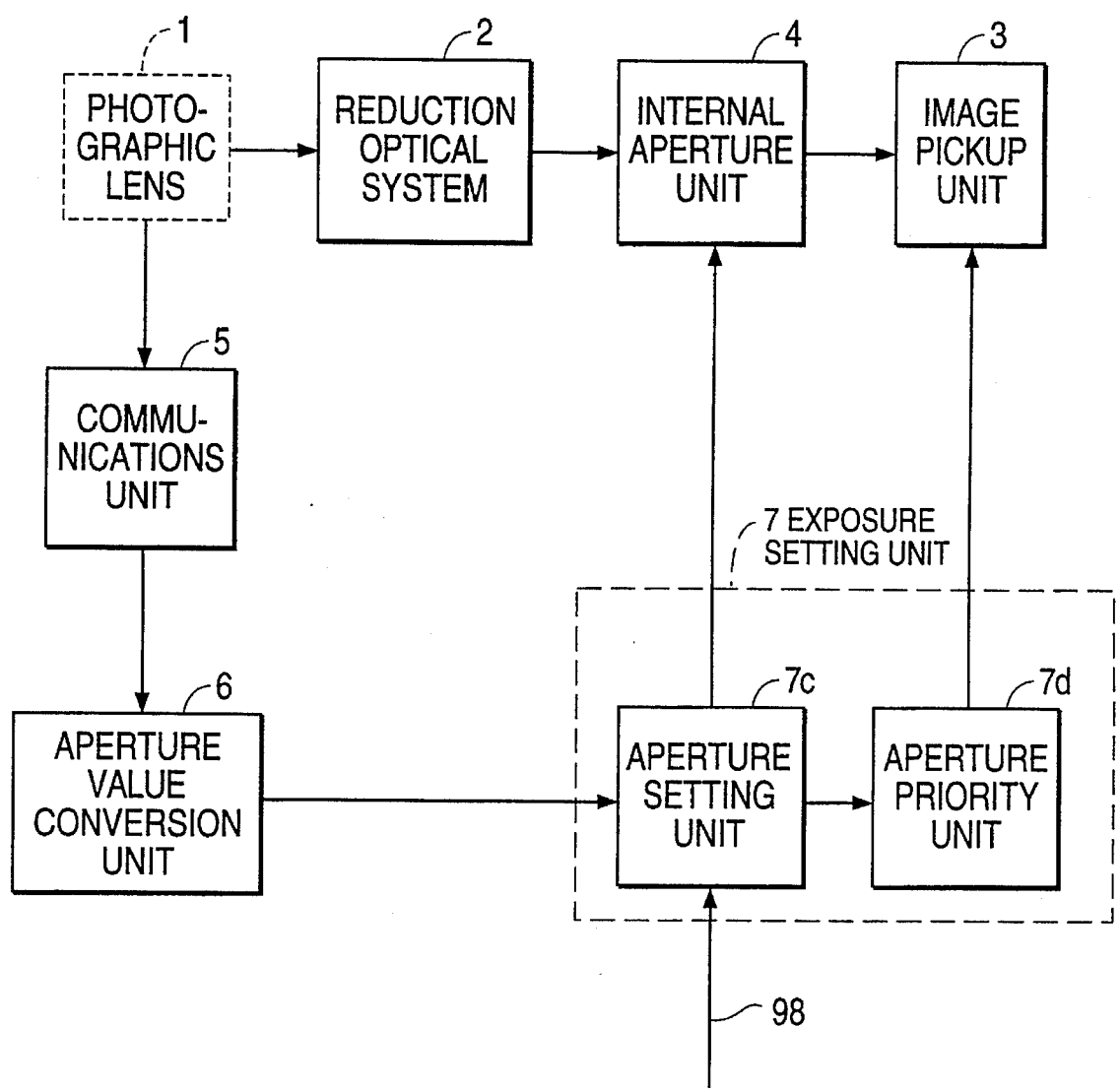
FIG. 5 is a diagram illustrating a camera which sets an aperture value of an internal value when the camera is in aperture priority exposure mode, according to an embodiment of the present invention.

FIG. 5 is a diagram illustrating a camera which sets an aperture value of an internal value when the camera is in aperture priority exposure mode, according to an embodiment of the present invention. Referring now to FIG. 5, exposure setting unit 7 includes an aperture setting unit 7c and an aperture priority unit 7d. Aperture setting unit 7c sets the aperture value of internal aperture unit 4 based on a set aperture value 98 selected by the photographer, with the converted open aperture value determined by aperture value conversion unit 6 as a lower limit for the aperture value of internal aperture unit 4. Aperture priority unit 7d sets the exposure time of image pickup unit 3 for the correct exposure, in accordance with the aperture value set by aperture setting unit 7c.

Therefore, the aperture value of an aperture in internal aperture unit 4 is set by an operator (via aperture setting unit 7c) within a range in which the open aperture value converted by aperture value conversion unit 6 is the lower limit. The aperture value control range is accurately determined, and the aperture value set by the operator is limited to a value within the control range.

Figure 6:
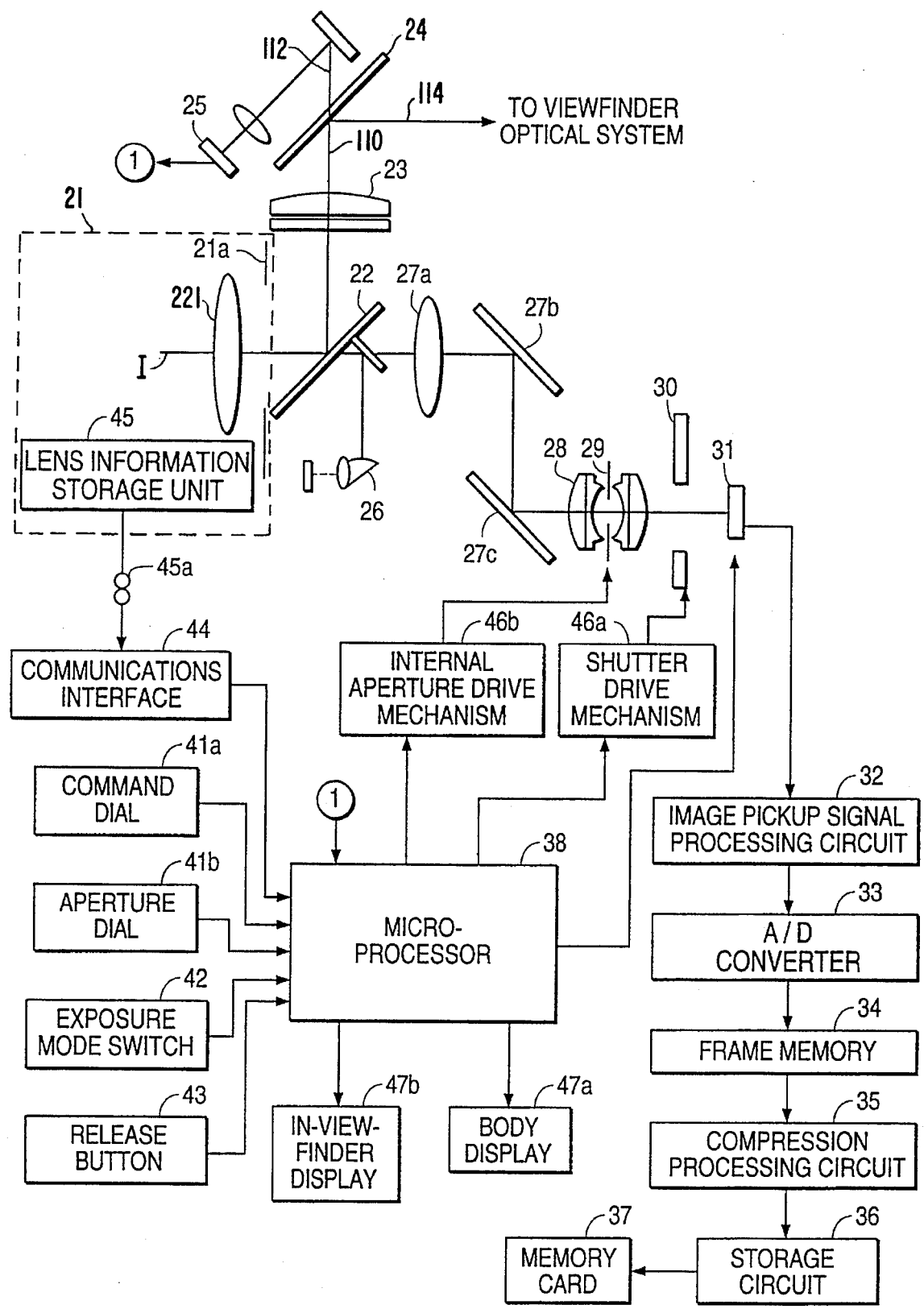
FIG. 6 is a diagram illustrating a camera which combines features of the cameras illustrated in FIGS. 2–5, according to an embodiment of the present invention.
Figure 7:
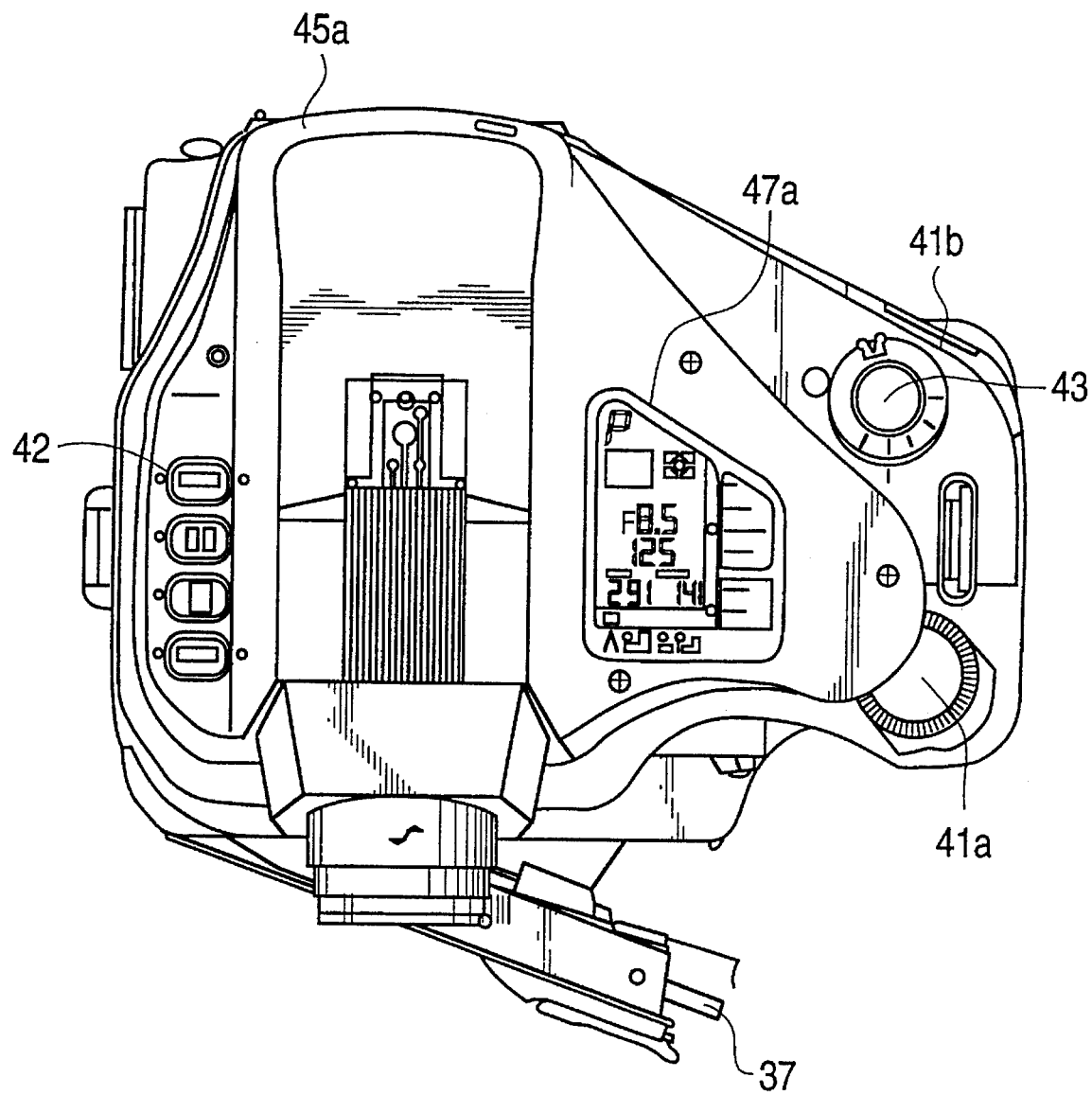
FIG. 7 is a top view of the camera illustrated in FIG. 6, according to an embodiment of the present invention.

FIG. 6 is a diagram illustrating a camera which combines features of the cameras illustrated in FIGS. 2–5, according to an embodiment of the present invention. FIG. 7 is a top view of the camera illustrated in FIG. 6. Referring now to FIGS. 6 and 7, a lens aperture 21a is positioned inside a photographic lens 21. Photographic lens 21 also has a lens system 221 therein. A quick return mirror 22 is positioned on an angle to the optical axis I of photographic lens 21. Light passes through photographic lens 21 and is reflected in the reflection direction 110 of quick return mirror 22. The light reflected in the reflection direction 110 of quick return mirror 22 passes through a focusing screen 23 and is received by a half-mirror 24 positioned at an angle to the reflection direction 110 of quick return mirror 22. A photometric unit 25 is positioned in the permeation direction 112 of half-mirror 24, and a viewfinder optical system (not illustrated) is positioned in the reflection direction 114 of half-mirror 24.

A rangefinding unit 26 is positioned behind quick return mirror 22. A lens 27a, a mirror 27b, a mirror 27c, and a condenser lens 28 are positioned behind quick return mirror 22 along the optical axis I of photographic lens 21. An internal aperture 29 is positioned inside condenser lens 28, and a shutter 30 and a CCD element 31 are positioned on the optical axis of condenser lens 28.

The image output of CCD element 31 is in digital form and is received by an A/D converter 33. A/D converter 33 converts the image output of CCD element 31 into an analog signal and supplies the analog signal to a frame memory 34. The output of frame memory 34 is compressed by a compression compressing circuit 35, and provided to a storage circuit 36. The output of storage circuit 36 is connected to a memory card 37.

Various dials and switches control camera operation. Such dials and switches include a command dial 41a to allow a photographer to select the exposure time (shutter speed), an aperture dial 41b to allow a photographer to change an aperture value, an exposure mode switch 42 to set the exposure mode, and a release button 43 to initiate photographic processes.

A lens information storage unit 45 is built into photographic lens 21. Lens information storage unit 45 stores the open aperture value of photographic lens 21, or information relating the open aperture value of photographic lens 21. A communications interface 44 is connected to lens information storage unit 45 via a lens identification pin 45a on a lens mount section (not illustrated) of the camera. A shutter drive mechanism 46a drives shutter 30. An internal aperture drive mechanism 46b drives internal aperture 29. A body display 47a displays information on the camera body, and an in-viewfinder display 47b displays information inside the camera viewfinder.

A microprocessor 38 is connected individually to, and controls, CCD element 31, photometric unit 25, command dial 41a, aperture dial 41b, exposure mode switch 42, release button 43, communications interface 44, in-viewfinder display 47b, body display 47a, internal aperture drive mechanism 46b and shutter drive mechanism 46a.

When photographic lens 21 is installed into the electronic camera body, lens aperture 21a inside photographic lens 21 is held in the open condition by a device such as a lens mount lever (not illustrated). The subject light passing through lens aperture 21a enters photometric unit 25 via quick return mirror 22, focusing screen 23, and half-mirror 24. In this condition, the operator operates exposure mode switch 42 to correctly set the exposure mode.

In FIG. 6, lens 27a, mirror 27b, mirror 27c and condenser lens 28 correspond to reduction optical system 2 illustrated in FIGS. 2, 3, 4 and 5. Shutter 30 and CCD element 31 correspond to image pickup unit 3 illustrated in FIGS. 2, 3, 4 and 5. Internal aperture 29 corresponds to the aperture in internal aperture unit 4 illustrated in FIGS. 2, 3, 4 and 5. Communications interface 44 corresponds to communications unit 5 illustrated in FIGS. 2, 3, 4 and 5. Microprocessor 38 essentially functions as aperture value conversion unit 6 illustrated in FIGS. 2, 3, 4 and 5. Internal aperture drive mechanism 46b combined with microprocessor 38 function as exposure setting unit 7 illustrated in FIGS. 2, 3, 4 and 5. Photometric unit 25 functions as photometric unit 8 in FIG. 3. Microprocessor 38 functions as computation unit 9 illustrated in FIG. 3. Command dial 41a and microprocessor 38 function as shutter speed priority unit 7a illustrated in FIG. 4. Body display 47a, in-viewfinder display 47b and microprocessor function as warning unit 7b illustrated in FIG. 4. Aperture dial 41b and microprocessor 38 function as aperture setting unit 7c illustrated in FIG. 5. Shutter drive mechanism 46a and microprocessor 38 function as aperture priority unit 7d illustrated in FIG. 5. In effect, microprocessor 38 functions as a control unit to control camera operations.

Figure 8:
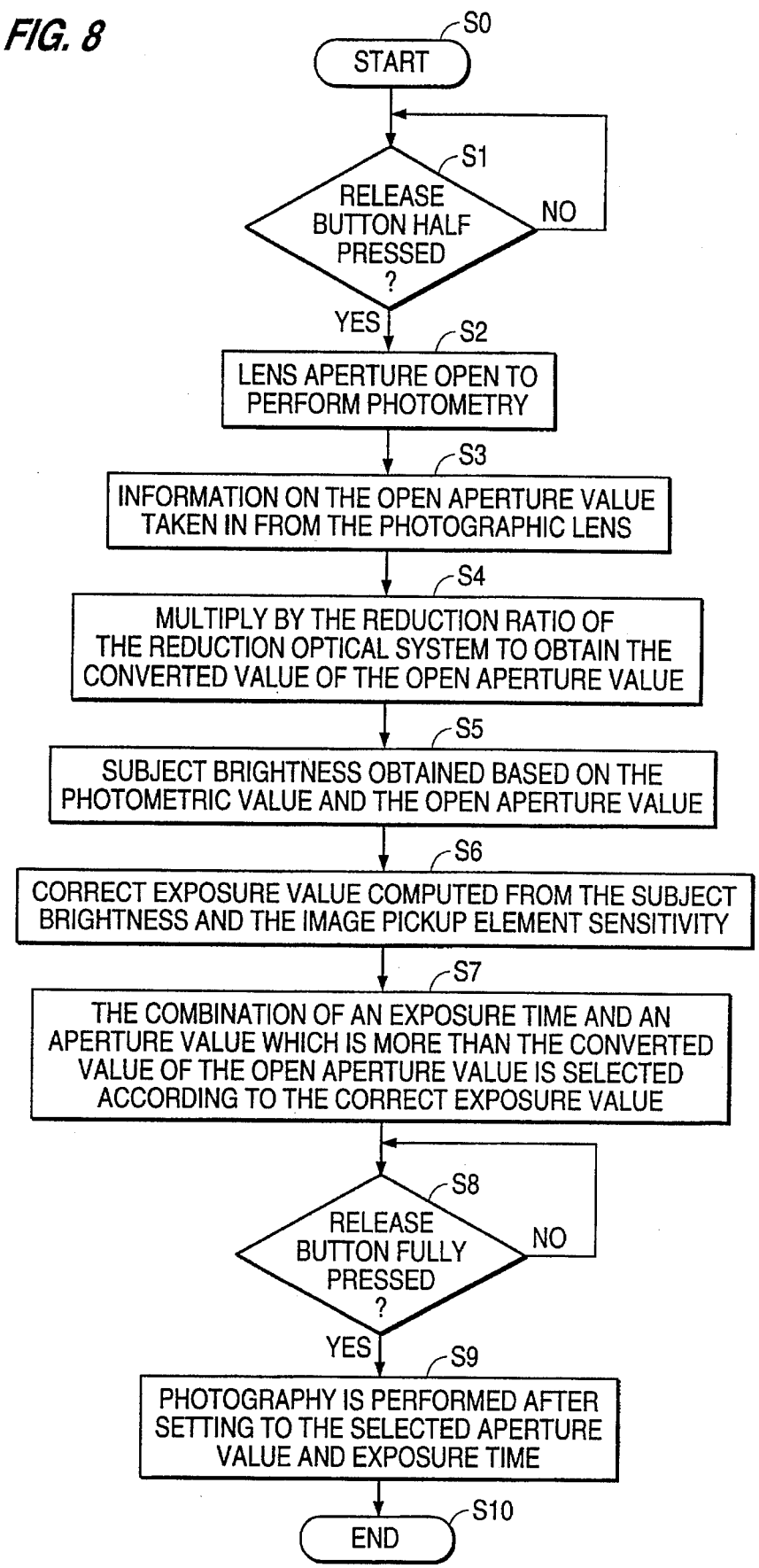
FIG. 8 is a flow chart illustrating a processing sequence for program exposure mode of a camera, according to an embodiment of the present invention.

FIG. 8 is a flow chart illustrating a processing sequence for program exposure mode of a camera, according to an embodiment of the present invention, where lens aperture 21a inside photographic lens 21 is held in the open condition.

Referring now to FIG. 8, the process starts in step S0. From step S0, the process moves to step S1, where it is determined whether or not release button 43 is pushed to the half-push position. When release button 43 is not pushed to the half-push position in step S1, the process waits until release button 43 is pushed to the half-push position. When release button 43 is pushed to the half-push position in step S1, the process moves to step S2, where photometric unit 25 measures the light from the subject. From step S2, the process moves to step S3, where microprocessor 38 receives information on the open aperture value of photographic lens 21 from lens information storage unit 45 via the communications interface 44.

The optical image formed by photographic lens 21 is reduced by condenser lens 28 or another reduction optical system (not illustrated), and the image plane illumination of CCD element 31 increases by a corresponding amount. For this reason, the process moves from step S3 to step S4, where microprocessor 38 multiplies the open aperture value (F value) received from communications interface 44 by the reduction ratio. In this manner, microprocessor 38 computes a converted value corresponding to the open aperture value of photographic lens 21 after the reduction optical section has been passed through.

From step S4, the process moves to step S5, where microprocessor 38 receives the photometric value from photometric unit 25. This photometric value results from the quantity of light being restricted by passing through the open aperture of photographic lens 21. From step S5, the process moves to step S6, where the subject brightness Bv is calculated from the photometric value by an inverse operation based on the open aperture value received from communications interface 44.

More specifically, in step S6, an apex computation indicated by:

$$Ev=Bv+Sv$$

is performed based on the subject brightness Bv and the sensitivity Sv of CCD element 31, to compute the correct exposure value Ev.

From step S6, the process moves to step S7, where microprocessor 38 selects the combination of the aperture value and the exposure time in accordance with the correct aperture value, within a range having the converted value of the open aperture value as a lower limit of the aperture value of internal aperture 29. This can be contrasted to a conventional program exposure mode, where the combination of exposure time and aperture value which gives the correct exposure value Ev is selected "as is" from the aperture value and exposure time combinations determined in advance.

From step S7, the process moves to step S8, where it is determined whether or not release button 43 is pushed to the full-push position. When release button 43 is not pushed to the full-push position in step S8, the process waits for release button 43 to be pushed to the full-push position. When release button 43 is pushed to the full-push position in step S8, the process moves to step S9, where microprocessor 38 causes internal aperture drive mechanism 46b to step down internal aperture 29 to the selected aperture value, and causes shutter drive mechanism 46a to expose CCD element 31 only for the selected exposure time. In this manner, CCD element 31 picks up the subject image. From step S9, the process moves to step S10 and ends.

According to embodiments of the present invention, program exposure mode photography is performed as in FIG. 8. Therefore, the control range of the aperture value of internal aperture 29 is accurately determined according to the open aperture value of photographic lens 21, and the aperture value of the internal aperture 29 is set within that range. As a result, the operability of the electronic camera is markedly increased without a need for the operator to take into account the control range of the aperture value for each photographic lens 21 installed. Also, exposure errors during photography can be reliably prevented.

Figure 9:
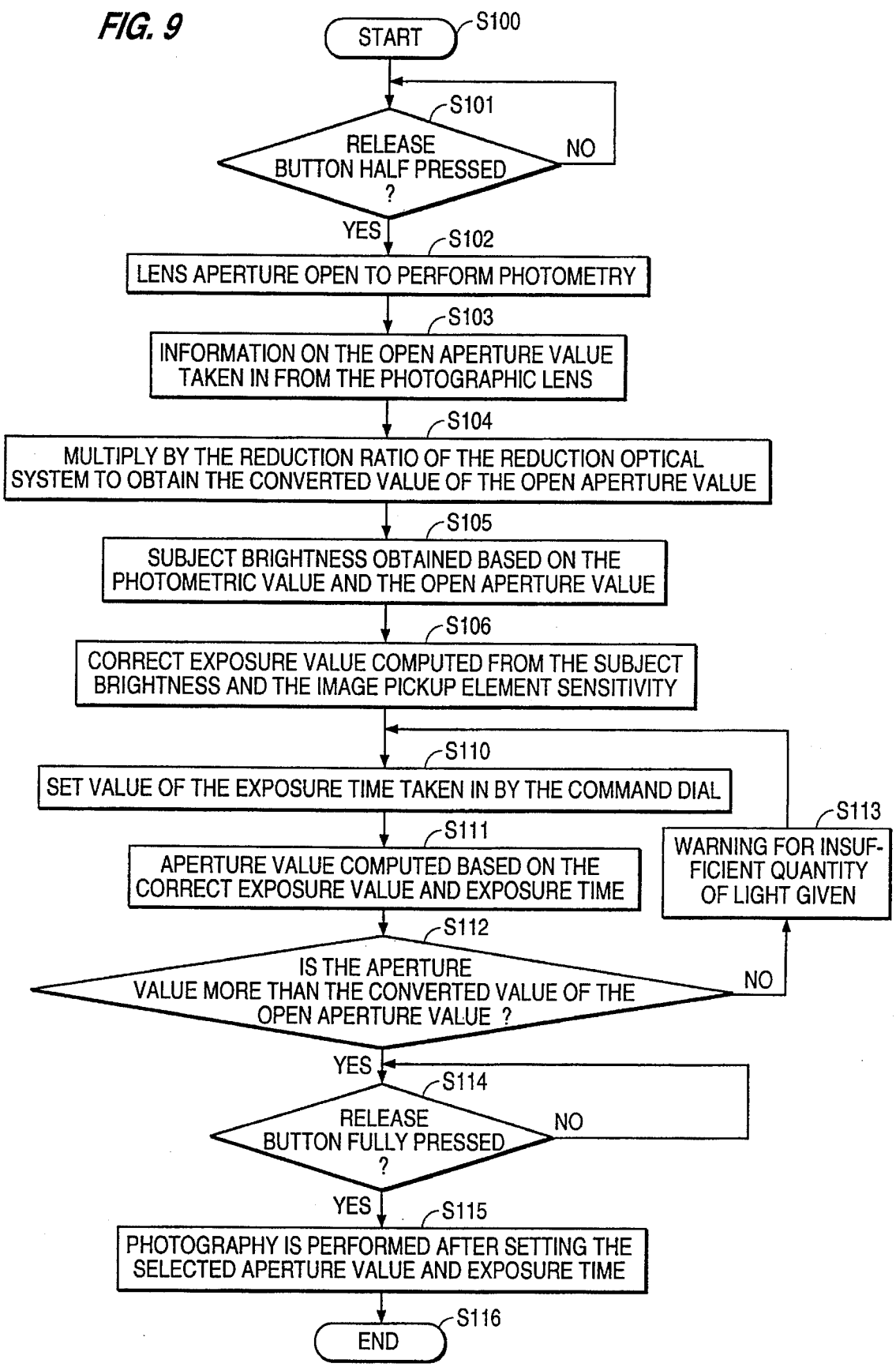
FIG. 9 is a flow chart illustrating a processing sequence for shutter speed priority exposure mode of a camera, according to an embodiment of the present invention.

FIG. 9 is a flow chart illustrating a processing sequence for a shutter speed priority exposure mode of a camera, according to an embodiment of the present invention. In the shutter speed priority exposure mode, the operator rotates command dial 41a to select the exposure time (shutter speed) displayed on body display 47a.

Referring now to FIG. 9, the process starts in step S100. From step S100, the process moves to step S101, where it is determined whether or not release button 43 is pushed to the half-push position. When release button 43 is not pushed to the half-push position in step S101, the process waits until release button 43 is pushed to the half-push position. When release button 43 is pushed to the half-push position in step S101, the process moves to step S102, where photometric unit 25 measures the light from the subject. From step S102, the process moves to step S103, where microprocessor 38 receives information on the open aperture value of photographic lens 21 from lens information storage unit 45 via the communications interface 44.

The optical image formed by photographic lens 21 is reduced by condenser lens 28 or another reduction optical system (not illustrated), and the image plane illumination of CCD element 31 increases by a corresponding amount. For this reason, the process moves from step S103 to step S104, where microprocessor 38 multiplies the open aperture value (F value) received from communications interface 44 by the reduction ratio. In this manner, microprocessor 38 computes a converted value corresponding to the open aperture value of photographic lens 21 after the reduction optical section has been passed through.

From step S104, the process moves to step S105, where microprocessor 38 receives the photometric value from photometric section 25. This photometric value results from the quantity of light being restricted by passing through the open aperture of photographic lens 21. From step S105, the process moves to step S106, where the subject brightness Bv is calculated from the photometric value by an inverse operation based on the open aperture value received from communications interface 44.

More specifically, in step S106, an apex computation indicated by:

$$Ev=Bv+Sv$$

is performed based on the subject brightness Bv and the sensitivity Sv of CCD element 31, to compute the correct exposure value Ev.

From step S106, the process moves to step S110. As previously described for the shutter speed priority exposure mode, the operator rotates command dial 41a to select the exposure time (shutter speed) displayed on body display 47a. Therefore, in step S110, microprocessor 38 receives the set value of the exposure time selected by command dial 41a. From step S110, the process moves to step S111, where microprocessor 38 computes the aperture value which gives the correct exposure value according to the set value of the exposure time. From step S111, the process moves to step S112, where it is determined whether or not the aperture value is more than the converted value of the open aperture value determined in step S104. When the computed aperture value is less than the converted value of the open aperture value in step S112, the process moves to step S113, where microprocessor 38 causes a mark to be displayed on body display 47a or in-viewfinder display 47b to indicate "insufficient light", thereby prompting the operator to change the exposure time setting. From step S113, the process returns to step S110 and microprocessor 38 repeatedly receives the set value of the exposure time until the appropriate exposure time is set.

On the other hand, when the computed aperture value is at or above the converted value of the open aperture value in step S112, the process moves to step S114 where it is determined whether or not release button 43 is pushed to the full-push position. When release button 43 is not pushed to the full-push position in step S114, the process waits until release button 43 is pushed to the full-push position. When release button 43 is pushed to the full-push position in step S114, the process moves to step S115, where photography is executed after setting the selected aperture value and exposure time. From step S115, the process moves to step S116 and ends.

According to embodiments of the present invention with shutter speed priority exposure mode as illustrated in FIG. 9, an warning light is emitted (indicating an insufficient quantity of light) when the computed value of the aperture value falls below the converted value of the open aperture value, thereby prompting the operator to reset the exposure time. Therefore, the operator can perform exposure time setting and adjustment of the exposure time setting according to the warning without taking into account the control range of the aperture value, which differs with each photographic lens 21. As a result, exposure adjustment in the shutter speed priority exposure mode of an electronic camera becomes markedly easier, and exposure errors during photography can be reliably prevented.

Figure 10:
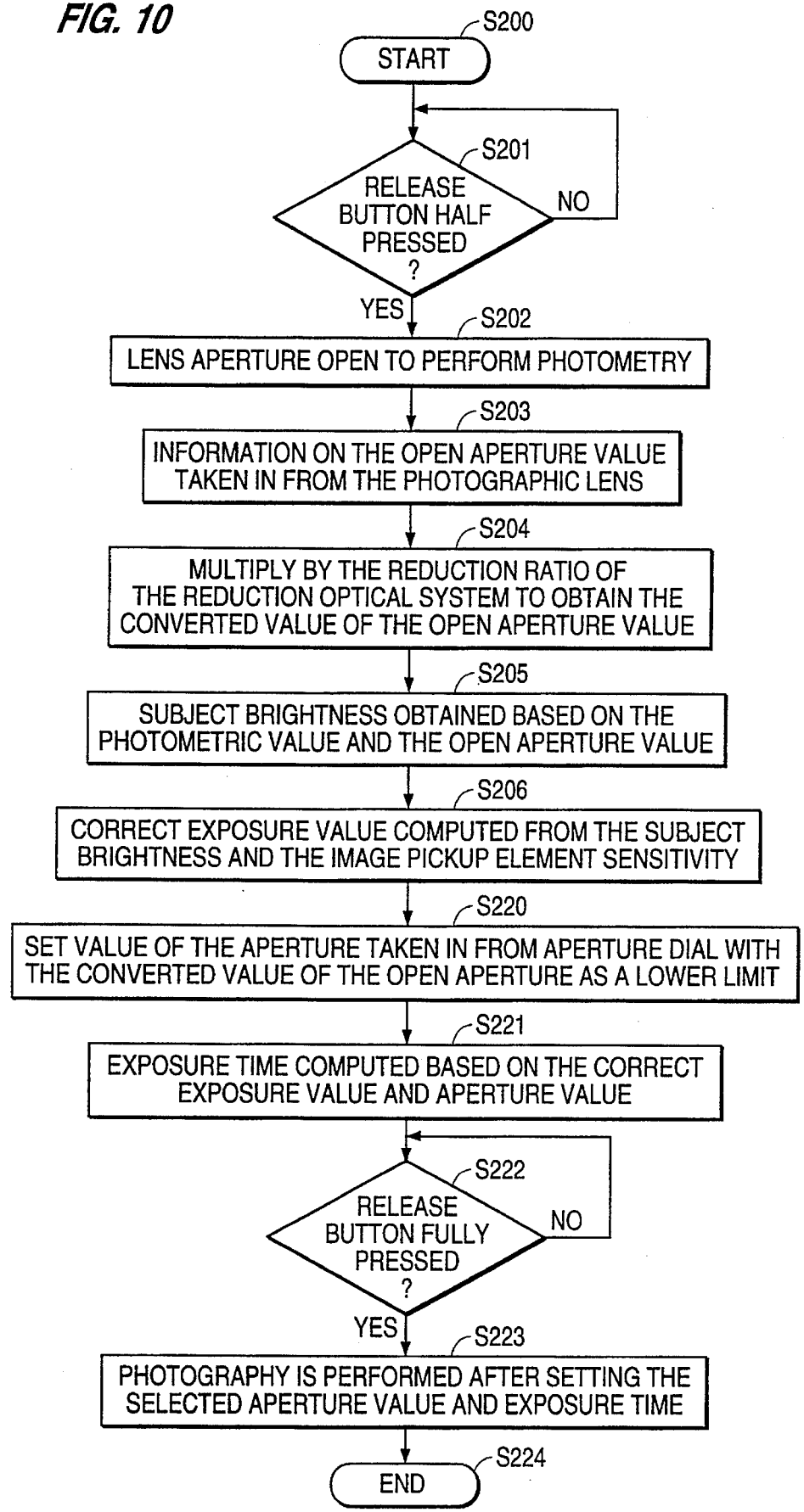
FIG. 10 is a flow chart illustrating a processing sequence for aperture priority exposure mode of a camera, according to an embodiment of the present invention.

FIG. 10 is a flow chart illustrating a processing sequence for an aperture priority exposure mode of a camera, according to an embodiment of the present invention. In aperture priority exposure mode, the operator rotates aperture dial 41b to change the aperture value displayed on body display 47a.

Referring now to FIG. 10, the process starts in step S200. From step S200, the process moves to step S201, where it is determined whether or not release button 43 is pushed to the half-push position. When release button 43 is not pushed to the half-push position in step S201, the process waits until release button 43 is pushed to the half-push position. When release button 43 is pushed to the half-push position in step S201, the process moves to step S202, where photometric unit 25 measures the light from the subject. From step S202, the process moves to step S203, where microprocessor 38 receives information on the open aperture value of photographic lens 21 from lens information storage unit 45 via the communications interface 44.

The optical image formed by photographic lens 21 is reduced by condenser lens 28 or another reduction optical system (not illustrated), and the image plane illumination of CCD element 31 increases by a corresponding amount. For this reason, the process moves from step S203 to step S204, where microprocessor 38 multiplies the open aperture value (F value) received from communications interface 44 by the reduction ratio. In this manner, microprocessor 38 computes a converted value corresponding to the open aperture value of photographic lens 21 after the reduction optical section has been passed through.

From step S204, the process moves to step S205, where microprocessor 38 receives the photometric value from photometric unit 25. This photometric value results from the quantity of light being restricted by passing through the open aperture of photographic lens 21. From step S205, the process moves to step S206, where the subject brightness Bv is calculated from the photometric value by an inverse operation based on the open aperture value received from communications interface 44.

More specifically, in step S206, an apex computation indicated by:

$$Ev=Bv+Sv$$

is performed based on the subject brightness Bv and the sensitivity Sv of CCD element 31, to compute the correct exposure value Ev.

From step S206, the process moves to step S220. As previously discussed, in aperture priority exposure mode, the operator rotates aperture dial 41b to change the aperture value displayed on body display 47a. Therefore, in step S220, microprocessor 38 displays the aperture value on body display 47a so that the displayed range has the converted open aperture value (determined in step S204) as a lower limit. The operator then uses aperture dial 41b to select an aperture value within the displayed range. Then, also in step S220, microprocessor 38 receives the aperture value selected by the operator.

From step S220, the process moves to step S221, where microprocessor 38 computes the exposure time which gives the correct exposure value, based on the aperture value selected in step S220. In this condition, the process moves from step S221 to step S222, where the process waits until release button 43 is pushed to the full-push position. When release button is pushed to the full-push position in step S222, the process moves to step S223, where photography is performed after setting the aperture value selected in step S220 and the exposure time computed in step S221. From step S223, the process moves to step S224 and ends.

According to embodiments of the present invention, aperture priority mode photography is performed as illustrated in FIG. 10 so that the control range of the aperture value is determined according to the open aperture value of photographic lens 21, and setting of the aperture value is performed so that it is limited to the determined control range. Therefore, in an electronic camera according to embodiments of the present invention, exposure setting in the aperture priority exposure mode is easier then with a conventional electronic camera. Moreover, in an electronic camera according to embodiments of the present invention, there is no need for the operator to take into account the control range of the aperture value, which differs with each photographic lens, and exposure errors during photography can be reliably prevented.

In the electronic camera according to the above embodiments of the present invention, CCD element 31 (such as a CCD sensor) is used as an image pickup element. However, the present invention is not intended to be limited to use with a CCD element. Instead, virtually any type of image pickup elements can be used. For example, a MOS image pickup element or an image pickup tube can be used as an image pickup element.

In the electronic camera according to the above embodiments of the present invention, the converted value of the open aperture value is obtained with the aperture value of internal aperture 29 as a reference. However, it is sufficient to compare the open aperture value of photographic lens 21 and the aperture value of internal aperture 29. Thus, the reference during conversion is not particularly limited. For example, it is possible to display in advance the aperture value of internal aperture 29 using a value which corresponds to the aperture value of photographic lens 21. In this manner, the operator is able to judge such factors as the depth of field of the electronic camera using the aperture value scale of a silver salt camera with which the operator has become proficient.

Also, in the electronic camera according to the above embodiments of the present invention, the incident light from photographic lens 21 is measured. However, the present invention is not intended to be limited to this type of through-the-lens (TTL) photometry. For example, the photometry section of an external light system may be attached to directly measure the subject brightness.

Moreover, in the electronic camera according to the above embodiments of the present embodiment, a mark which indicates that the quantity of light is insufficient is displayed. However, the present invention is not intended to be limited to this specific type of mark. For example, a warning for an insufficient quantity of light can be generated by sound, light, or any other mechanism.

In the electronic camera according to above embodiments of the present invention, in the condition in which a warning for an insufficient quantity of light is given in shutter speed priority exposure mode (see step S113 in FIG. 9), photography is not performed even if release button 43 is pushed to the full-push position. However, photography can be allowed even though there is an insufficient quantity of light when release button 43 is pushed to the full-push position.

According to the above embodiments of the present invention, information on the open aperture value of the photographic lens is received from the installed photographic lens, and the lower limit of the aperture value of the internal aperture is computed based on the received open aperture value. Therefore, the control range of the aperture value can be accurately determined according to the installed photographic lens. As a result, the photographic procedure becomes easier and the operability of the electronic camera is markedly increased without the need for the operator to take into account the lower limit of the aperture value for each photographic lens installed, and exposure errors during photography can be reliably prevented.

According to the above embodiments of the present invention, an aperture value which gives the correct exposure is selected within the aperture value control range determined in advance for each photographic lens, so that the correct aperture value can be set. Also, information on the open aperture value of the photographic lens is received by a communications interface. The information is used to compute the lower limit of the aperture value by an aperture value conversion unit. The information is also used to compute the correct exposure by a computation unit. Thus, only one communications unit needs to be used, and the electronic camera can be made more compact and lower in cost.

According to the above embodiments of the present invention, in shutter speed priority exposure mode, when the set value of the aperture value falls below the converted value of the open aperture value, which is the lower limit, a warning is generated to prompt the operator to reset the exposure time. In this manner, the correct exposure can be reliably set. Therefore, the operator may perform exposure time setting and adjustment of the exposure time setting according to the warning without taking into account the control range of the aperture value, which differs with each photographic lens. As a result, the exposure adjustment in the shutter speed priority exposure mode of the electronic camera becomes markedly easier, and exposure errors during photography can be reliably prevented.

According to the above embodiments of the present invention, in aperture priority exposure mode, the aperture value of an internal aperture is set from the outside by an operator with the converted value of the open aperture value as a lower limit. Therefore, the aperture value can be set within the appropriate control range. As a result, exposure adjustment in the aperture priority exposure mode of the electronic camera becomes markedly easier with no need for the operator to take into account the control range of the aperture value, which differs with each photographic lens.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A camera having a photographic lens installable thereon, the photographic lens including a photographic lens aperture having an open aperture value, the camera comprising:

a reduction optical system which reduces an optical image formed by the photographic lens when the photographic lens is installed on the camera, the optical image being reduced by a reduction ratio;

an internal aperture having a settable aperture value and which restricts light passing through the photographic lens and the reduction optical system when the photographic lens is installed on the camera; and a control unit which receives the open aperture value of the photographic lens aperture when the photographic lens is installed on the camera, converts the open aperture value in accordance with the reduction ratio of the reduction optical system, and sets an aperture value of the internal aperture in a range having a lower limit of approximately the converted open aperture value.

2. A camera as in claim 1, further comprising:

a communications unit which receives the open aperture value from the photographic lens when the photographic lens is installed on the camera, and provides the open aperture value to the control unit, wherein the control unit comprises an aperture value conversion unit which converts the open aperture value in accordance with the reduction ratio of the reduction optical system, and an exposure setting unit which sets the aperture value of the internal aperture in a range having a lower limit of approximately the converted open aperture value.

3. A camera as in claim 2, further comprising an image pickup element receiving the optical image reduced by the reduction optical system.

4. A camera as in claim 1, further comprising:

a photometric unit which measures light from a photographic subject and passing through the photographic lens when the photographic lens is installed on the camera, and produces a corresponding photometric value, wherein the control unit computes the correct exposure value based on the open aperture value and the photometric value produced by the photometric unit, and sets the aperture value of the internal aperture to produce the correct exposure value and to be in a range having approximately the converted open aperture value as a lower limit.

5. A camera as in claim 2, further comprising:

a photometric unit which measures light from a photographic subject and passing through the photographic lens when the photographic lens is installed on the camera, and produces a corresponding photometric value, wherein the control unit further comprises a computation unit which computes the correct exposure value based on the open aperture value and the photometric value produced by the photometric unit, and produces a corresponding computation result, the exposure setting unit receiving the computation result produced by the computation unit and setting the aperture value of the internal aperture to produce the correct exposure value and to be in a range having approximately the converted open aperture value as a lower limit.

6. A camera having a photographic lens installable thereon, the photographic lens including a photographic lens aperture having an open aperture value, the camera comprising:

a reduction optical system which reduces an optical image formed by the photographic lens when the photographic lens is installed on the camera, the optical image being reduced by a reduction ratio;

an internal aperture having a settable aperture value and which restricts light passing through the photographic lens and the reduction optical system when the photographic lens is installed on the camera;

an image pickup element receiving the optical image reduced by the reduction optical system and having an exposure time which is set by a photographer;

a control unit which receives the open aperture value of the photographic lens aperture when the photographic lens is installed on the camera, converts the open aperture value in accordance with the reduction ratio of the reduction optical system, receives the set exposure time of the image pickup element and sets the aperture value of the internal aperture to produce the correct exposure value in accordance with the set exposure time; and a warning unit which produces a warning to indicate that there is an insufficient quantity of light when the aperture value set by the control unit is smaller than the converted open aperture value.

7. A camera as in claim 6, further comprising:

a photometric unit which measures light from a photographic subject and passing through the photographic lens when the photographic lens is installed on the camera, and produces a corresponding photometric value, wherein the control unit receives the photometric value produced by the photometric unit and computes the correct exposure value based on the open aperture value and the photometric value.

8. A camera as in claim 7, further comprising:

a communications unit which receives the open aperture value from the photographic lens when the photographic lens is installed on the camera, and provides the open aperture value to the control unit, wherein the control unit comprises an aperture value conversion unit which converts the open aperture value in accordance with the reduction ratio of the reduction optical system, and a shutter speed priority unit which sets the aperture value of the internal aperture to produce the correct exposure value in accordance with the set exposure time.

9. A camera having a photographic lens installable thereon, the photographic lens including a photographic lens aperture having an open aperture value, the camera comprising:

a reduction optical system which reduces an optical image formed by the photographic lens when the photographic lens is installed on the camera, the optical image being reduced by a reduction ratio;

an internal aperture having an aperture value which is set by a photographer within a specific range and which restricts light passing through the photographic lens and the reduction optical system when the photographic lens is installed on the camera;

an image pickup element receiving the optical image reduced by the reduction optical system and having a settable exposure time; and a control unit which receives the open aperture value of the photographic lens aperture when the photographic lens is installed on the camera, converts the open aperture value in accordance with the reduction ratio of the reduction optical system, sets the lower limit of the specific range to be approximately the converted open aperture value, receives the aperture value set by the photographer within the specific range, sets the aperture value of the internal aperture to the set aperture value, and sets the exposure time of the image pickup element to produce the correct exposure time in accordance with the set aperture value.

10. A camera as in claim 9, further comprising:

a communications unit which receives the open aperture value from the photographic lens when the photographic lens is installed on the camera, and provides the open aperture value to the control unit, wherein the control unit comprises an aperture value conversion unit which converts the open aperture value in accordance with the reduction ratio of the reduction optical system, an aperture setting unit which receives the converted open aperture value from the aperture value conversion unit, sets the lower limit of the specific range to be approximately the converted open aperture value, receives the aperture value set by the photographer within the specific range, and sets the aperture value of the internal aperture to the set aperture value, and an aperture priority unit which receives the set aperture value from the aperture setting unit and sets the exposure time of the image pickup element to produce the correct exposure time in accordance with the set aperture value.

\* \* \* \* \*

UNITED STATES PATENT AND TRADEMARK OFFICE
CERTIFICATE OF CORRECTION

PATENT NO. : 5,587,766
DATED : December 24, 1996
INVENTOR(S) : Koichiro KAWAMURA et al.

It is certified that error appears in the above-indentified patent and that said Letters Patent is hereby corrected as shown below:

<u>Title Page</u>, Section [57], In the Abstract, line 10, "conveys" should be --converts--.

Signed and Sealed this

First Day of July, 1997

Attest:

BRUCE LEHMAN

*Attesting Officer*  *Commissioner of Patents and Trademarks*